United States Patent

Wochner

[15] 3,648,815
[45] Mar. 14, 1972

[54] BRAKE DEVICE

[72] Inventor: Joseph J. Wochner, Pontiac, Ill.

[73] Assignee: Interlake Steel Corporation, Chicago, Ill.

[22] Filed: June 15, 1970

[21] Appl. No.: 46,313

[52] U.S. Cl. .................................193/35 A, 188/290
[51] Int. Cl. ...........................B65g 13/00, B65g 13/075
[58] Field of Search................193/35 A; 188/266, 272, 290, 188/298

[56] References Cited

UNITED STATES PATENTS

| 2,833,347 | 5/1958 | Terry.................................188/298 X |
| 3,314,514 | 4/1967 | Hundhausen et al. ...............193/35 A |
| 3,078,966 | 2/1963 | Thomas...............................188/298 |

Primary Examiner—Evon C. Blunk
Assistant Examiner—W. Scott Carson
Attorney—William P. Porcelli

[57] ABSTRACT

Wheel structure having an outer tire region of flexible material hollowed to define an annular dead end fluid passage containing entrapped fluid.

4 Claims, 8 Drawing Figures

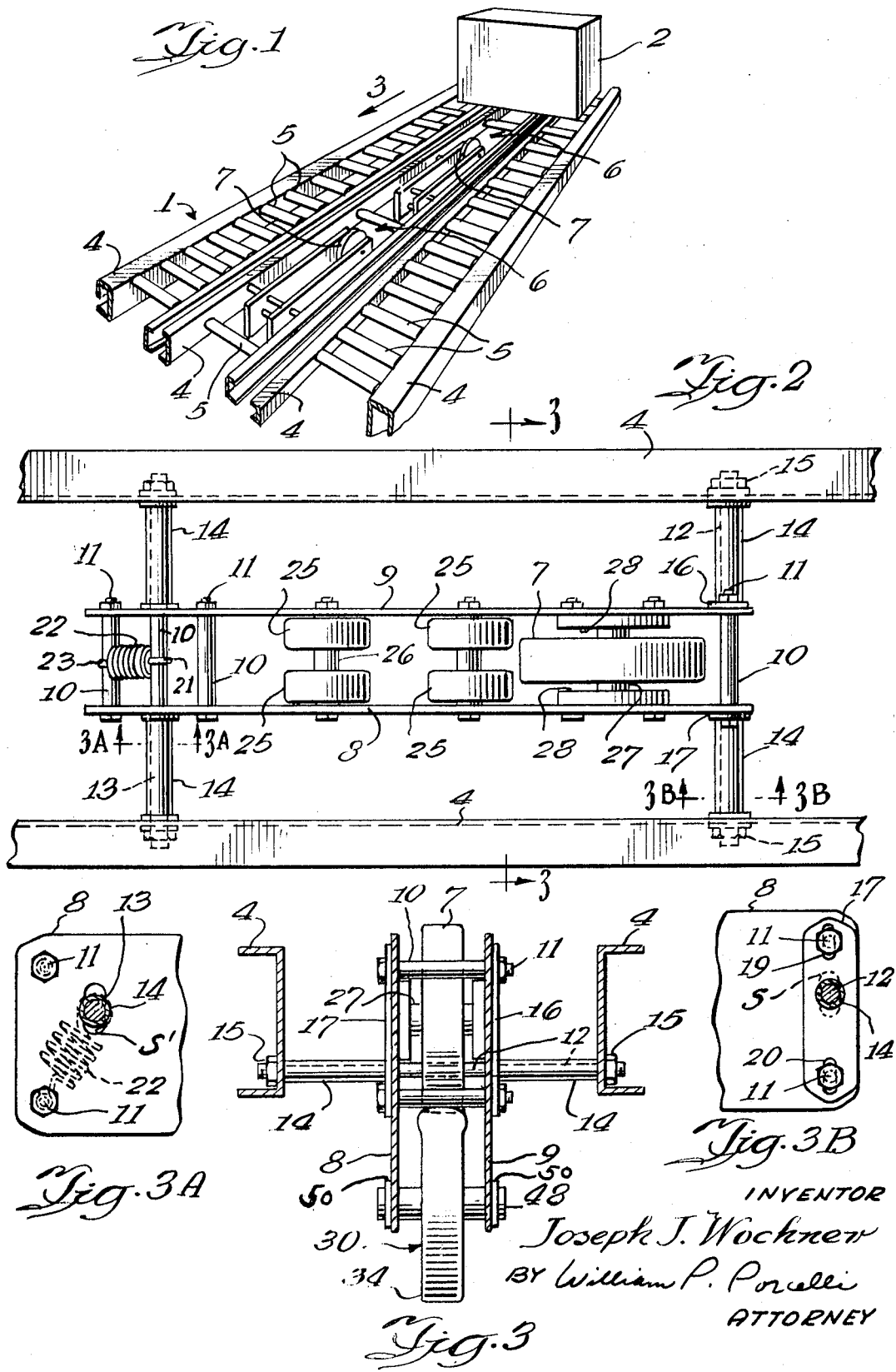

INVENTOR
Joseph J. Wochner
BY William P. Porcelli
ATTORNEY

BRAKE DEVICE

BACKGROUND OF THE INVENTION

The present invention generally relates to the art of braking or snubbing devices, and more particularly, relates to a snubbing device having particular application in gravity flow conveyors for retarding the velocity of objects traveling along such conveyors.

A braking device for retarding the velocity of gravity conveyed objects is shown and described in U.S. Pat. No. 3,473,642 of W. C. Lorden et al., which is assigned to the assignee of the present invention, and the disclosure of which to the extent not inconsistent herewith is specifically incorporated herein by this reference.

Briefly, the device shown in the above copending application includes a roller mounted so as to be rotated by an object moving along the conveyor. A controlled drag against rotation of the roller, and hence, controlled braking force on the object being conveyed is accomplished by connecting the roller through a crank to reciprocally drive a piston which is slidably guided in a cylinder containing fluid. The piston is provided with a small orifice through which the fluid is metered from one side of the piston to the other during reciprocation thereof, the resistance of the orifice to through-flow of the fluid acting to retard rotation of the roller, and thereby brake the moving object.

A desirable feature of the above-described braking device is that it provides a braking force which increases in proportion to the force and speed with which a load traveling on a conveyor contacts it. A second desirable feature is that it is functionally operative in two directions of travel of a load operating on it. There remains, however, a need for a braking device having the above desirable features but which is of simpler and less expensive construction.

SUMMARY OF THE INVENTION

In accordance with the present invention, a braking device for retarding the movement of an object includes a body of flexible material having an elongated fluid passage containing entrapped fluid. A flow restricting orifice is produced in the passage by virtue of localized squeezing engagement of the body by means which further produces fluid-throttling travel of the orifice relative to the fluid in the passage upon movement of the object, the above means being engageable in retarding relation with the object so that the resistance of the orifice to through-flow of the entrapped fluid acts to brake the movement of the object.

In the form illustrated herein, the above means comprise a pair of wheels and the body of flexible material is mounted in tirelike fashion on one of the wheels with the passage annularly encircling the wheel. The wheels are rotatable in a common plane and mounted so that the tirelike body is squeezed therebetween (thus producing the orifice).

BRIEF DESCRIPTION OF THE DRAWINGS

A more complete understanding of the invention will be had upon reference to the detailed description to follow and to the accompanying drawings in which:

FIG. 1 shows a partial perspective view of a gravity conveyor embodying braking devices made in accordance with the present invention;

FIG. 2 shows a top plan view of a braking device indicated in use in FIG. 1;

FIG. 3 is a sectional view taken, as indicated, along the line 3—3 of FIG. 2;

FIG. 3A is a sectional view taken, as indicated, along the line 3A—3A of FIG. 2;

FIG. 3B is a sectional view taken, as indicated, along the line 3B—3B of FIG. 2.

DETAILED DESCRIPTION

As more fully described below, the braking device of the present invention utilizes the known technique of causing captive fluid to be metered through an orifice, the relative size of which determines the magnitude of braking force.

Essentially, the braking device of the present invention for retarding the movement of an object includes a body of flexible material that has an elongated dead-end flow passage containing entrapped fluid. Means squeeze the body to produce a fluid-restricting orifice within the passage, the means being responsive to movement of the object in retarding relation thereto to produce fluid-throttling travel of the orifice relative to the fluid in the passage, the resistance of the orifice to metering or through-flow of the entrapped fluid acting to brake the movement of the object.

Figure 4:
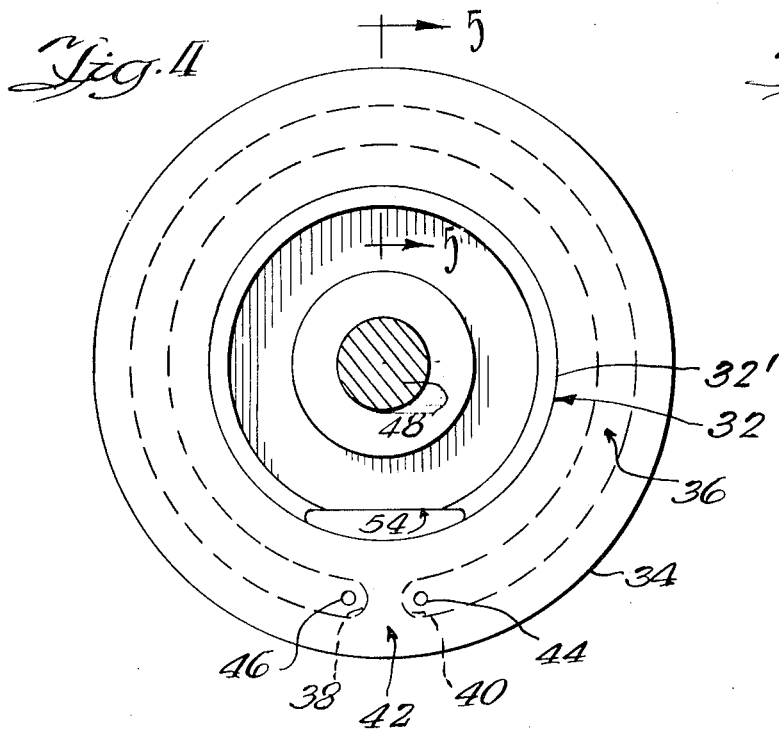
FIG. 4 shows a side-elevational view of the snubber wheel in accordance with the present invention.
Figure 5:
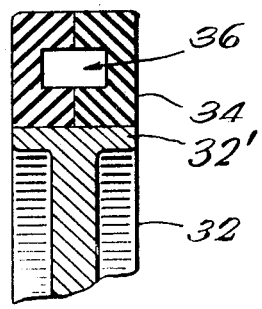
FIG. 5 shows a sectional view of the snubber wheel taken, as indicated, along the line 5—5 of FIG. 4.
Figure 6:
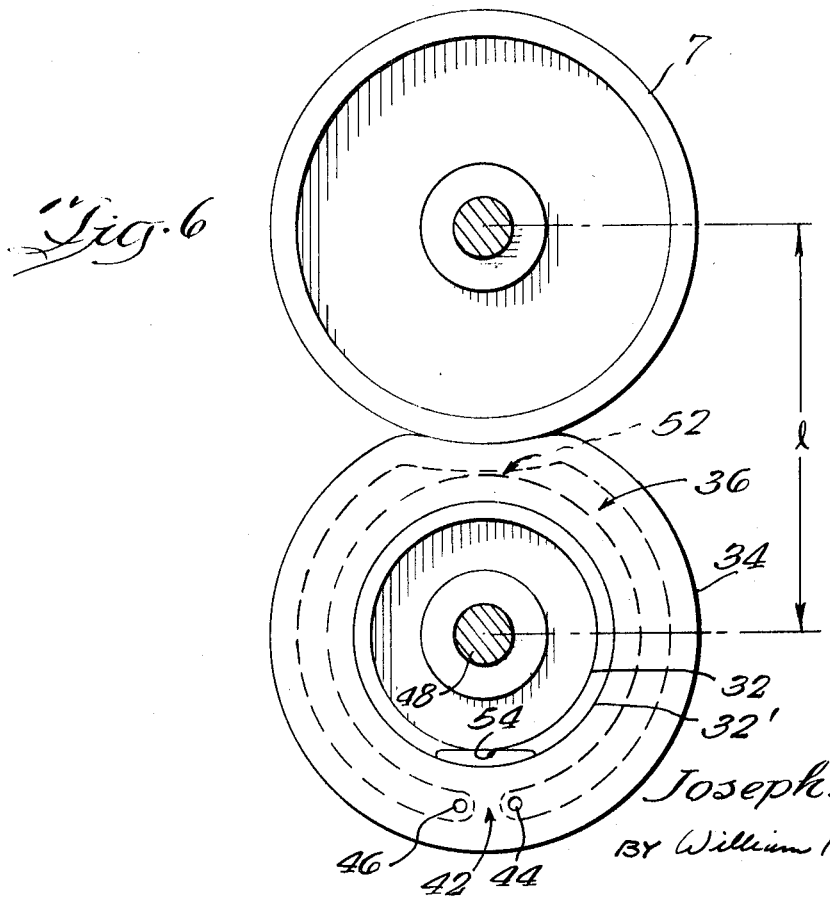
FIG. 6 shows a side-elevational view illustrating the condition of the snubber wheel when the tire is squeezed between the roller and wheel.

As described more fully below, in the illustrated arrangement, the above-mentioned means comprise a pair of wheels 7 and 32, the body of flexible material comprising an outer tirelike region 34 of wheel 32 (FIGS. 4 to 6). Wheels 7 and 32 are mounted to rotate in a common plane about axes which are spaced a distance so that the tire region 34 of wheel 32 is squeezed between wheels 7 and 32 so as to constrict the tire region and form an orifice 52 in the passage 36 that annularly encircles wheel 32. Upon being urged to rotate, wheel 7 in turn drivingly rotates tire 34 and wheel 32, thereby forcing the orifice 52 to move relative to the entrapped fluid in the passage 36. The ensuing resistance of the orifice 52 to through-flow of the fluid acts to resist rotation of wheel 7, the amount of resistance being a function of the relative size of the orifice which is determined by the spacing of the axes of wheels 7 and 30.

For purposes of complete illustrative disclosure, the braking device is shown herein as it may be incorporated for controlling the speed of an object or load being conveyed along a gravity conveyor.

As particularly indicated in FIG. 1, the gravity conveyor 1 is mounted with a slope which would ordinarily cause the object or load 2 to move down the conveyor 1 in the direction of the arrow 3. The conveyor 1 is of conventional construction having guide rails 4 arranged in pairs with freely rotatable rollers 5 mounted between the pairs of rails 4 with the upper portions of the rollers projecting slightly above the upper surface of the rails 4. The conveyor is shown in a combination of three roller widths, but it can be of any desired width including rollers of suitable lengths to accommodate the width desired.

Unless arrested or retarded in movement, the load 2 is free to accelerate down the conveyor 1. Oftentimes, the acceleration causes excessive speed resulting in damaging impacts to the load upon its being stopped intermediate or at the end of the conveyor. In order to retard this acceleration and reduce the speed of the load 2 to a desired level, retarder devices 6 incorporating the invention are suitably positioned at desired intervals along the length of the conveyor 1. Although only two retarder devices 6 are indicated on the length of the conveyor 1 shown, the number of retarder devices 6 required depends upon the length of the conveyor, its slope, the weight of the loads 2 and the spacing of the braking devices 6 from each other.

Each of the retarder devices 6 is provided with a rubber rimmed wheel or braking roller 7 which ordinarily projects slightly above the level of the rollers 5 of the conveyor so that a load 2 rolling down the conveyor will have its lower surface contacting these brake rollers 7 and cause their rotation.

With reference to FIGS. 2 and 3, the basic frame of the retarder devices 6 consists of two sideplates 8 and 9 which extend parallel to each other and are spaced in this parallel position by means of spacer sleeves 10 extending transversely of the sideplates 8 and 9. Certain of the spacer sleeves 10 are held assembled to the sideplates 8 and 9 by means of bolt fasteners 11 extending through the spacer sleeves 10 and suitable openings in the sideplates 8 and 9. In addition, two of the spacers 10 are mounted on shafts 12 and 13 which are used to mount the braking devices 6 on the conveyor 1. The shaft 12 extends through slots S (FIG. 3B) in the sideplates 8 and 9, respectively, and beyond the lateral margins of these sideplates 8 and 9. Additional spacer sleeves 14 are provided on these projecting ends of the shaft 12, and these ends extend through openings in the rails 4 and are secured in place by means of threaded fasteners 15 secured on their threaded ends. The threaded fasteners 15 are secured on the shaft 12 in a manner to provide a looseness between the spacer sleeves 14 and 10 as that the sideplates 8 and 9, along with the mechanism attached thereto, can pivot on the shaft 12 to raise or lower the brake roller 7, as will be described.

In the vicinity of the shaft 12, there are attached to the outside surfaces of the sideplates 8 and 9 adjustment plates 16 and 17. The shaft 12 extends through conforming round openings in these adjustment plates 16 and 17 so that the adjustment plates 16 and 17 cannot shift transversely relative to the shaft 12. Further, the shaft 12, once positioned in rails 4 is likewise prevented from shifting relative to the rails 4. If it is necessary to adjust the relative height of the brake roller 7, it is necessary to move the sideplates 8 and 9 of the retarder device 6 up or down relative to the shaft 12 along the slots S until the desired position is reached. During this movement, the sideplates 8 and 9 must likewise shift relative to the adjustment plates 16 and 17 because the shafts are in a fixed position relative to these adjustment plates 16 and 17. In order to accommodate this motion, the bolt fasteners 11 are loosened so that the adjustment plates 16 and 17 are free to shift relative to the sideplates 8 and 9 as they are guided in slotted openings 19 and 20 (FIG. 3B). When the proper position is reached, the bolt fasteners 11 are tightened to fix the positions of the adjustment plates 16 and 17 relative to the sideplates 8 and 9.

At the end of the retarder device 6 supported by the shaft 13, the shaft 13 extends through slotted openings S' (FIG. 3A) which permit relative movement up and down of the sideplates 8 and 9 relative to the shaft 13 as they pivot on the shaft 12. One end 21 of a tension spring 22 is secured around the spacer 10 on shaft 13 and its other end 23 is secured around the spacer sleeves 10 on one of the bolt fasteners 11. The normal position of the retarder device 6 is one whereby the slots S' have their ends clear of the shaft 13 so that there can be relative movement in both directions of the retarder device 6 relative to the shaft 13. As a load 2 comes down the conveyor 1, enough free movement against the pressure of the spring 22 must be provided so that the upper periphery of the brake roller 7 can lower slightly to properly contact the lower surface of the load 2. The slotted openings S' should be long enough so that there is sufficient travel in both directions that the brake roller 7 can return to its raised position after the load 2 has passed over it. The force of the spring 22 must be sufficient to strongly urge the brake roller 7 against the undersurface of the load 2 and thereby minimize slippage between the brake roller 7 and the load 2.

To provide relative continuity of support along the conveyor 1, auxiliary rollers 25 are suitably journaled on shafts 26 and these rollers 25 are positioned at levels approximately equal to the levels of the rollers 5 of the conveyor 1.

The brake roller 7 is mounted on a shaft 27 which is suitably journaled for rotation in bearings 28 secured to the sideplates 8 and 9. To apply a braking force on the load being conveyed, wheel structure comprising a wheel 32 having an outer tire portion 34 is mounted for rotation below the wheel or brake roller 7. The tire portion 34 has an interior dead-end flow passage 36 which annularly encircles the wheel 32 and terminates at opposite sides 38, 40 of a solid or dammed region 42 of the tire 34. The flow passage 36 is completely filled with a suitable hydraulic fluid, such fluid being introduced through a suitable input port 44 at one side of the dammed region. A suitable air escape port 46 at the opposite end of the passage 36 facilitates fluid fill.

As will become clear, the above wheel structure performs a snubbing function and will be referred to hereinafter as snubber wheel 30.

The snubber wheel is mounted on a shaft 48 which is suitably journaled in bearings 50 that are by suitable means adjustably secured to the sideplates 8 and 9 so that the distance 1 (see FIG. 6) between the axes of rotation of the roller 7 and wheel 32 can be varied.

As best shown in FIG. 6, the distance 1 is such that the roller 7 and the wheel 32 cooperate to squeeze the tire 34 in between. This causes the passage 36 to constrict and thereby define a flow-retarding orifice 52.

Upon passage of an object 2 being conveyed, the roller 7 will be caused to rotate and, because of the frictional contact between the roller 7 and the snubber wheel 30, corresponding rotation of the latter will be effected.

It will be noted that as the roller 7 and snubber wheel 30 rotate, the orifice 52 will be caused to move lengthwise relative to the fluid in the passage 36. Such results in a fluid pressure buildup in the region of the chamber forward to the direction of travel of the orifice caused by resistance of the orifice to through-flow of the fluid which resists relative movement of the orifice and, hence, rotation of the roller 7. The resistance to rotation varies according to the size of the orifice formed so that by adjusting the distance 1, proper snubbing action can be obtained.

The outer periphery or rim 32 of the wheel 32 is shown having a radially inwardly projecting recess 54 in the region of the solid or dammed portion 42 to accommodate inward flexing of the tire 34 in the region of the dammed portion. This permits for unimpeded 360° rotation of the roller 7 and snubber wheel 30.

In the preferred embodiment shown herein, the tire 34 is fabricated by seaming together (see FIG. 5) a pair of molded tire sections that are each channel-shaped in cross section. The tire is then cemented to the wheel 32.

While the snubber wheel 30 is illustrated herein as having a single fluid chamber, additional radially spaced fluid passages chambers dammed at symmetrically spaced locations are contemplated. Such would provide greater uniformity in snubbing action where required.

Thus, while preferred constructional features of the invention are embodied in the structure illustrated herein, it is to be understood that changes and variations may be made by those skilled in the art without departing from the spirit and scope of the appended claims.

What is claimed is:

1. In combination with an elongated conveyor surface for conveying objects, a braking device for retarding the movement of an object traveling along said conveyor comprising, a body of flexible material having an elongated dead-end flow passage containing entrapped fluid, and means in localized squeezing engagement with said body for producing a fluid-restricting orifice within said passage, said means being movably responsive to movement of the object in retarding relation thereto to produce fluid-throttling travel of said orifice relative to the fluid in said passage, whereby resistance of said orifice to through-flow of the entrapped fluid acts to brake the movement of the object along the conveyor and wherein said means comprise a pair of wheels, one of said wheels mounting said body in tirelike fashion in pinched rolling engagement with the other of said wheel structures.

2. A braking device in accordance with claim 1, wherein said means includes a pair of wheels mounted to rotate in a common plane about parallel spaced axes, said body being mounted in tirelike fashion on one of said wheels in pinched engagement with the other of said wheels with said passage annularly encircling said one of said wheels, whereby travel of said orifice relative to the fluid in said passage is effected upon rotation of said wheels.

3. A braking device in accordance with claim 1 wherein said means includes a pair of wheels mounted to rotate in a common plane about parallel spaced axes, one of said wheels being frictionally engageable with the object so as to be drivingly rotated thereby, said body being mounted in tirelike fashion on one of said wheels in pinched engagement between said wheels with said passage annularly encircling said one of said wheels, whereby said travel of said orifice is effected through rotation of said wheels.

4. In a gravity conveyor, snubber mechanism for controlling the speed of an object being conveyed along the conveyor, said snubber mechanism comprising, a pair of wheel structures mounted to rotate in substantially nonslip rolling engagement about a pair of parallel spaced axes with one of said wheel structures being in intercepting relation to the travel path of movement of the object being conveyed so as to be rotated upon passage of the object, the other of said wheel structures having an outer tire region of flexible material hollowed to define a dead-end flow passage annularly encircling said other of said wheel structures and containing entrapped fluid, the distance between said axes being less than the sum of the radii of said wheel structures to effect localized pinching of the tire region and constriction of a corresponding region of the flow passage to provide a fluid flow restricting orifice within said passage whereby rotation of said wheel structures produces travel of said orifice in fluid throttling relation relative to the fluid in said passage, the resistance of the orifice to through-flow of the entrapped fluid acting in opposition to said rotation to produce braking action by said one of said wheel structures on the object when the object is in contact therewith and being conveyed along the conveyor.

* * * * *